United States Patent
Telman

(10) Patent No.: US 11,958,649 B2
(45) Date of Patent: Apr. 16, 2024

(54) METHOD OF STORING AND TRANSPORTING STRIPS OF ADHESIVE MATERIAL

(71) Applicant: Christopher Telman, Franklin, TN (US)

(72) Inventor: Christopher Telman, Franklin, TN (US)

( * ) Notice: Subject to any disclaimer, the term of this patent is extended or adjusted under 35 U.S.C. 154(b) by 0 days.

(21) Appl. No.: 17/973,050

(22) Filed: Oct. 25, 2022

(65) Prior Publication Data

US 2023/0148002 A1 May 11, 2023

Related U.S. Application Data

(60) Provisional application No. 63/276,919, filed on Nov. 8, 2021.

(51) Int. Cl.
| | |
|---|---|
| *B65B 11/04* | (2006.01) |
| *B65B 11/00* | (2006.01) |
| *B65B 63/04* | (2006.01) |
| *C09J 7/40* | (2018.01) |
| *C09J 201/00* | (2006.01) |

(52) U.S. Cl.
CPC ............ *B65B 63/04* (2013.01); *B65B 11/004* (2013.01); *C09J 7/403* (2018.01); *C09J 201/00* (2013.01); *C09J 2301/312* (2020.08)

(58) Field of Classification Search
USPC .......................................................... 53/429
See application file for complete search history.

(56) References Cited

U.S. PATENT DOCUMENTS

| | | | |
|---|---|---|---|
| 2008/0081186 A1* | 4/2008 | Ellringmann | B65H 19/102 428/343 |
| 2021/0207006 A1* | 7/2021 | Nowak | D21H 27/38 |
| 2022/0058984 A1* | 2/2022 | Ambartsoumian | G09F 3/02 |

* cited by examiner

*Primary Examiner* — Chinyere J Rushing-Tucker
(74) *Attorney, Agent, or Firm* — Russell D. Nugent; The Humphries Firm, P.C.

(57) ABSTRACT

A plurality of strips of tape, attached to a single release liner and separated from the adjacent strip of material by a perforated area, i.e. perforated slits separate each strip of adhesive material and separate the base layers into sections. These perforations allow for the base layer featuring the strips of adhesive material to be folded such that the strips of adhesive material are aligned and for easy separation of the different sections of base layer featuring the strips of adhesive material. This configuration allows a single release liner, featuring a plurality of strips of adhesive material to be divided into separate release liners each featuring less than all the strips of adhesive material attached to same. The release liner can be folded along the perforations and packaged into a wrapper featuring a hanging hole making the finished product convenient to display.

13 Claims, 4 Drawing Sheets

METHOD OF STORING AND TRANSPORTING STRIPS OF ADHESIVE MATERIAL

CROSS-REFERENCE TO RELATED APPLICATIONS

This application claims the benefit of priority to U.S. Provisional Application No. 63/276,919 filed on Nov. 8, 2021. The content of U.S. Provisional Application No. 63/276,919 filed on Nov. 8, 2021 is incorporated by reference in its entirety.

BACKGROUND OF THE INVENTION

(a) Field of the Invention

The present invention is in the technical field of packaging materials. More specifically, this disclosure relates to a novel structure and method for storing and dispensing strips of adhesive material such as packing tape.

(b) Background Art

Storing packing tape or other forms of adhesive material used for packaging presents certain difficulties. Traditionally, people that need to seal a package such as a cardboard box or tube, paper envelope or other form of container use strips of adhesive material that they pull away from a roll of the material, tearing or cutting off a strip that is the size they need and then they apply it to the container. However, this process requires the user to pull the adhesive material off a roll of the material which can be frustratingly difficult. It can be particularly difficult to separate the end of a strip of adhesive such as packing tape from the rest of the roll. Moreover, some adhesives such as packaging tape are notorious for being difficult to separate from the roll without tearing the strip in the wrong direction and/or getting the adhesive stuck to other surfaces. Strips of adhesive material are notoriously difficult to manipulate without a portion of the strip of adhesive material attaching to itself while being removed from the roll.

Furthermore, the user that needs to seal a container or otherwise apply strips of tape to another object is forced to purchase and or store a roll of tape, even when they only need one or two strips of tape for the job at hand. The user may well misplace the roll of tape in between uses requiring them to purchase additional tape when needed. In addition, the user may not find it convenient to carry something as bulky as a roll of tape with them when they know they will need to seal something. Rolls of tape are bulky and does not easily fit into a pocket.

There remains in the field a need for a novel way to store and transport strips of adhesive, such as packing tape, that does not require the user to obtain, store and transport a bulky roll of adhesive. In addition, there remains in the field a need for a method of storing strips of adhesive such that they are easy to remove from the device on which they are stored.

BRIEF SUMMARY OF THE INVENTION

The invention is a method of storing, transporting and using strips of adhesive material, such as, but not limited to tape. The inventive method involves a single base layer, or release liner, that has been divided into sections with perforated lines and folds. To each section, a strip of adhesive or tape is applied. The single base layer, in preferred embodiments and the inventor's anticipated best mode, is divided into sections by small cuts or perforations that run along a length of the base layer. The perforations make it easy for the user to separate a section of the base layer, and thus a single strip of adhesive material, from the rest of the sections. In some embodiments, the single base layer is provided with a single strip of tape one side of which is entirely attached from end to end to the base layer, i.e. no portion of the strip of adhesive is attached to a surface other than the base layer. A single base layer and strip of adhesive material can then be sectioned by perforating the base layer with the adhesive strip attached thereto.

In preferred embodiments and the inventor's anticipated best mode, a single base layer is provided with a plurality of strips of adhesive material attached thereto side by side with a small amount of space between the strips. The area of the release liner or base layer between the strips of adhesive can be perforated to make separating the sections and strips of adhesive from each other and easy.

Perforating the portion of the release liner that is in between each of the strips of adhesive also has the advantage of making the device easy to fold and store. The base layer featuring strips of adhesive can be folded such that each section is in contact with at least one section that is next to it when the device is folded. The folded device can be stapled or glued temporarily to assist in packaging—fugitive glue may be applied to temporarily bind the sections to each other while the entire release liner is packaged in an overwrap film style package. Optionally, the tape can be packaged in a flow wrapper or other type of bag and closed either by heat sealing, stapes, glue or some other means while a hole (a "hanging hole") placed in the wrapper makes the product easy to hang in a display case. Alternately, either before or after the sections of the release liner are folded over each other, a hanging hole can be placed in a portion of the release liner that extends past the point where adhesive is attached thereto thereby allowing the device to be hung for display purposes. This configuration allows the device to be displayed without the need for external packaging if desired.

In use, the user simply selects a strip of tape from a section of the release liner and either tears a section of the release liner away from the rest of the release liner and then removes the adhesive from the release liner or simply removes the strip of adhesive from the release liner without tearing the release liner along the perforations. The user is left removing tape from the release liner/base layer rather than from the back of another strip of adhesive as is necessarily the case when using a roll of tape. In addition, the device can be folded back up for easy storage. When folded the device can easily fit in a pocket or other small storage area.

Other, less commercially viable embodiments can include a strip of adhesive material that is attached to a single release liner both of which are perforated to divide the entire tape structure into sections. While preferred embodiments of the tape structure formed and used with the disclosed method have sections that are approximately equal in length and width, this is not always the case. Other embodiments can have strips of adhesive material and sections that vary in height and width and their orientation on the release liner. Preferred embodiments have vertically oriented sections that run up and down when the tape structure is hung vertically, in a display for example, but the orientation of the strips of adhesive and sections can vary as needed. They need not all be the same height or width. In addition, more than one strip of adhesive material can be attached to a single section of the release liner.

DETAILED DESCRIPTION OF THE INVENTION

Figure 1:
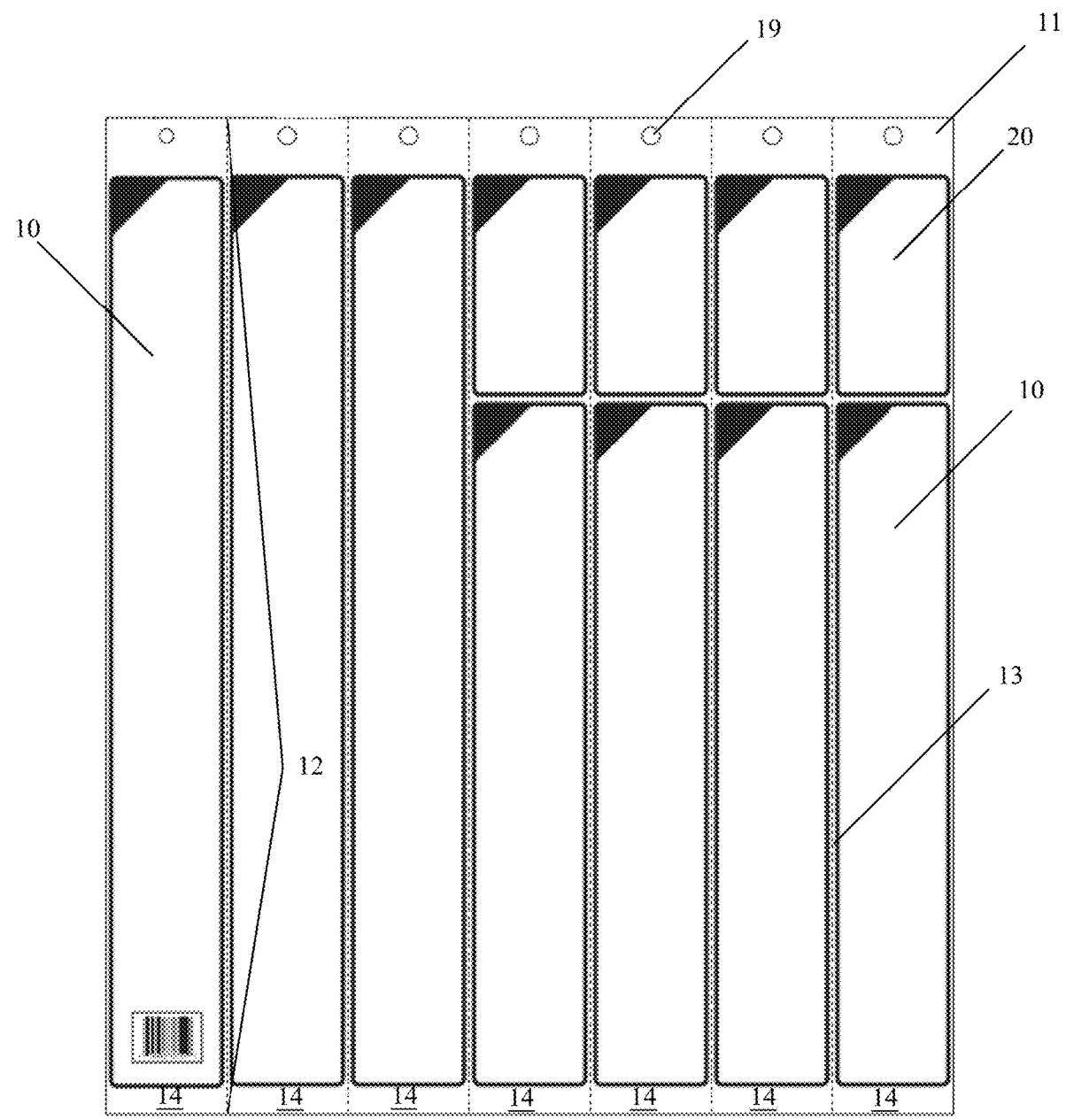
FIG. 1 is top plan view of the present invention.

FIG. 1 shows an embodiment of the presently disclosed device used in the inventive method. FIG. 1 shows a plurality of strips of adhesive material 10, e.g. tape, attached to a single base layer or release liner 11. Each strip of adhesive material 10 is releasably attached to the release liner 11 and the entire length of each strip of adhesive material 10 is attached to the release liner 11. Each strip of adhesive material 10 is separated from the adjacent strip of adhesive material 10 by a perforated area 12, i.e. perforated slits 13 in the release liner 11 separate each strip of adhesive material 10 and separate the base layer or release liner 11 into sections 14. These perforations 13 allow for the base layer 11 featuring the strips of adhesive material 10 to be folded such that the strips of adhesive material 10 are aligned—a user can fold the base layer/release liner 11 along the perforations 13 such that the sections 14 are stacked one on top of the other while still being held together at the perforations 13 to form a folded product the structure of which is reminiscent of an accordion. In addition, the perforations 13 allow for easy separation of the different sections 14 of base layer 11 featuring the strips of adhesive material 10.

In this embodiment, one or more of the sections 14 of release liner 11 have a second, shorter strip of adhesive material 10 sometimes referred to as a "tack down strip." The user can peel the tack down strip 20 away from the release liner 11 first and use it to secure a flap on a box or other structure that needs to be taped down while the user pulls a longer strip of adhesive material away from the release liner and properly sets it where desired. This makes for a simpler and neater package closure.

Figure 2:
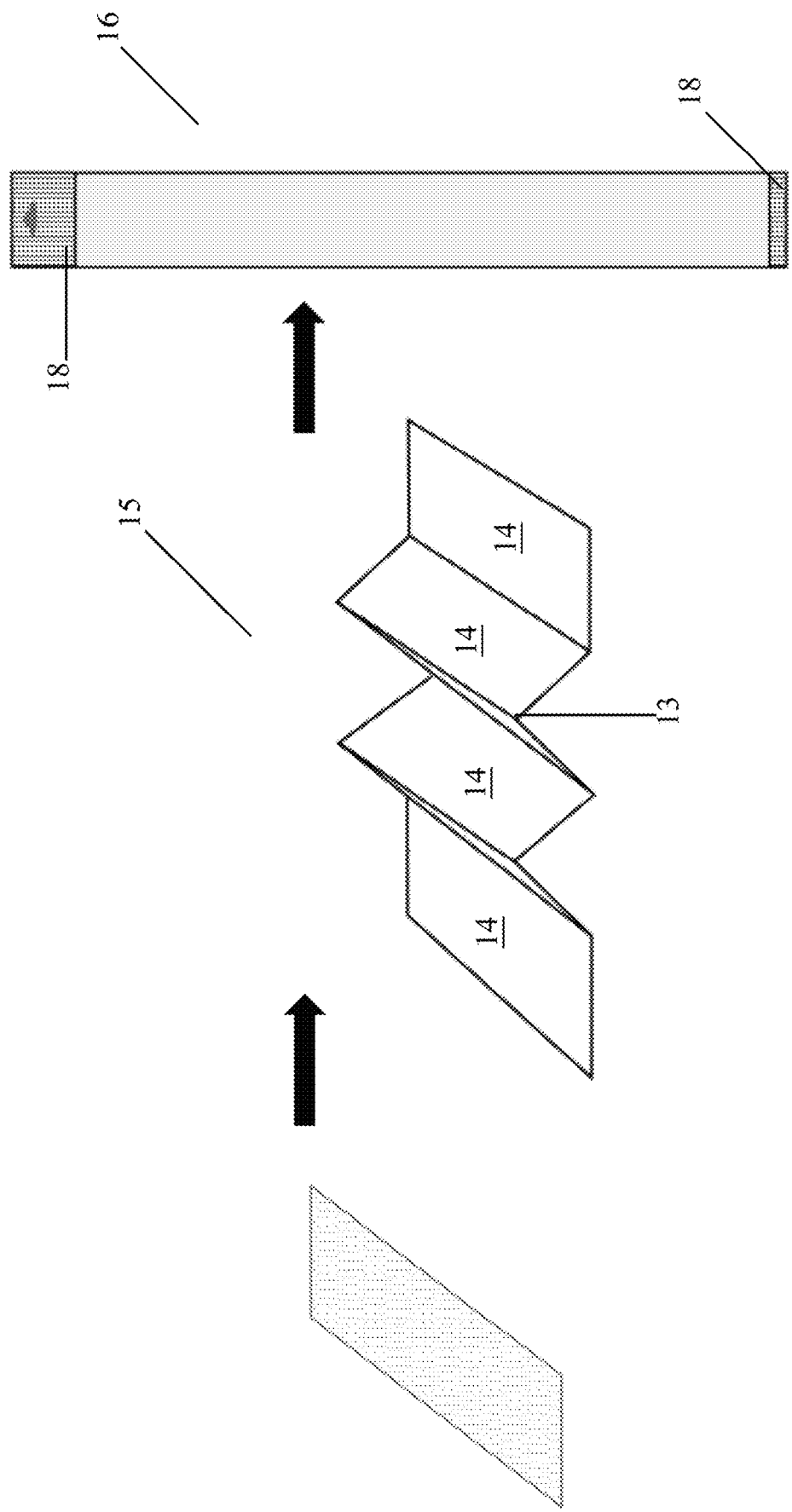
FIG. 2 is flow chart showing the device being placed into a wrapper.
Figure 3:
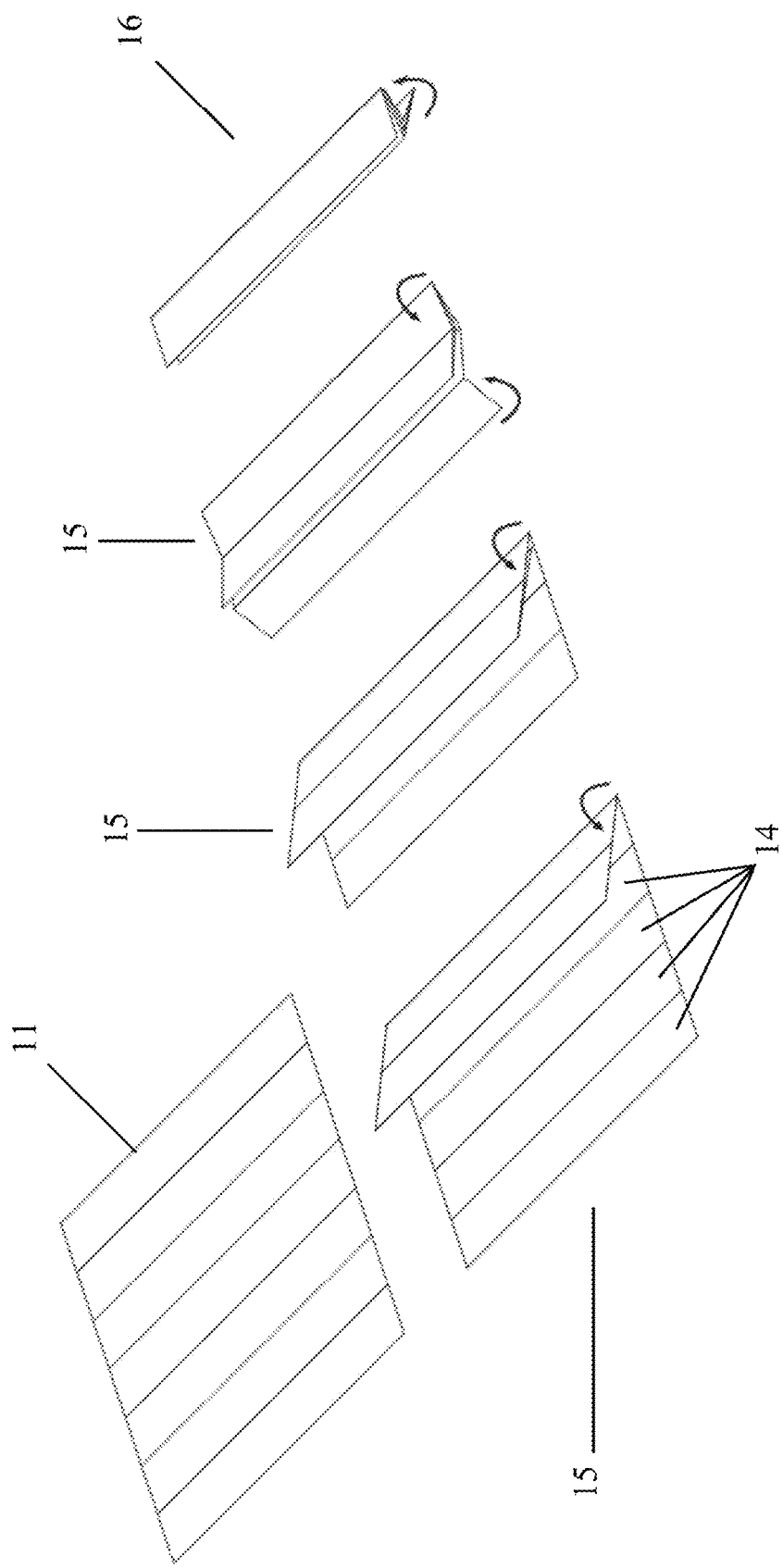
FIG. 3 is a flow chart showing the folding of the device.

FIG. 2 demonstrates the packaging of the release liner 11 to form a "booklet." The release liner/base layer 11 is folded along the perforations 13 to create the partially folded structure 15 that is shown in FIG. 3. There are a number of different ways to fold the partially folded structure 15 into a completely folded structure 16. One basic method is shown in FIG. 3. In this method the user starts with a section 14 that is at one end of the unfolded structure and either folds that section over on top of a second adjacent section 14 or, as is shown in FIG. 3, underneath a second, adjacent section 14. Then the first and second sections 14 are folder over the next section, in top of the next, third section in this case. This process is repeated until the user has a completely folded structure 16. The completely folded structure 16 is then inserted into a wrapper 18 (represented by the shading in the completely folded structure shown in FIG. 2).

Figure 4:
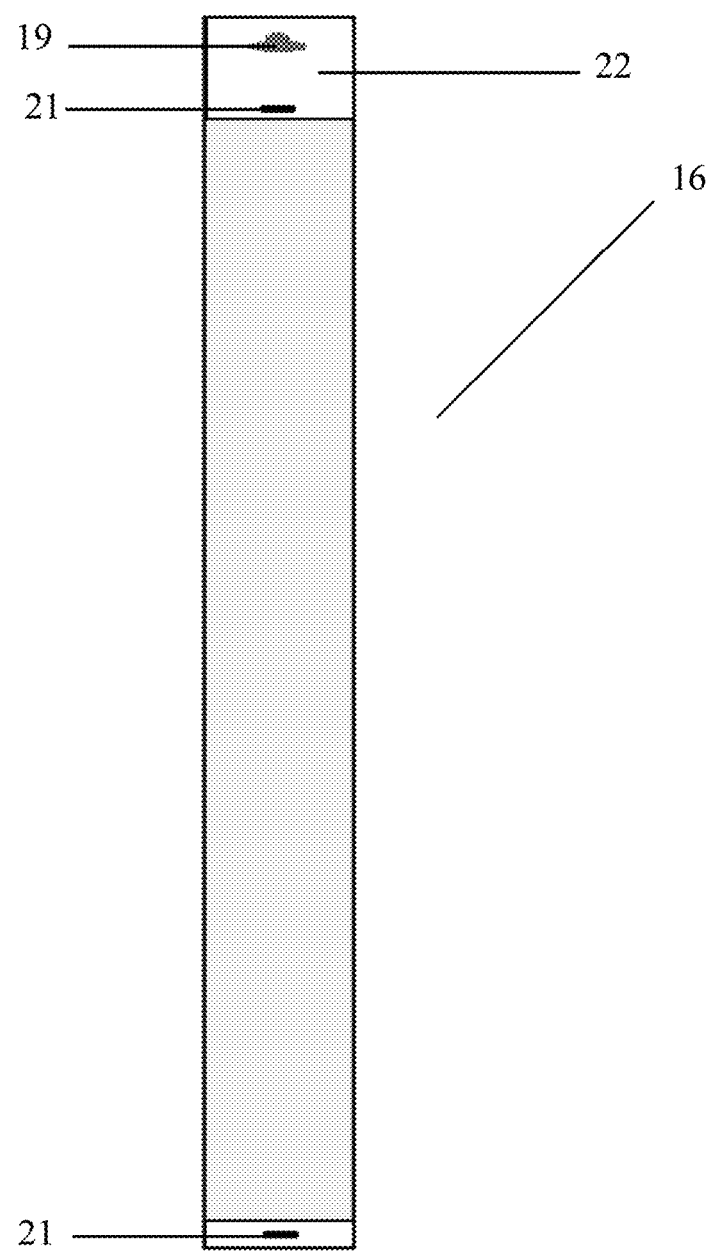
FIG. 4 is a plan view of the fully packaged device.

A preferred process of folding the sections is shown in FIG. 3. The inventor has determined that folding one or two sections 14 on top of the rest of the release liner 11 first, then continuing to fold sections 14 of the partially folded structure 15 underneath other sections 14 until the completely folded structure 16 results. FIG. 4 shows that the first two sections 14 on the right side of the release liner 11 can be folded first over onto the adjacent second two sections 14 that are situated to the left of and adjacent to the first two sections 14. This process is repeated until the partially folded structure 15 is three sections 14 wide and there is a single section 14 that has not been folded at the end opposite the end where the user started folding. That single section 14 is then folded underneath the rest of the partially folded structure 15 and the portion having two sections 14 folded repeatedly on top of each other is folded to form a completely folded structure 16 that is the width of and length of a single section of the release liner 11. Preferred embodiments and the inventor's anticipated best mode of the method use a release liner 11 that is divided into sections 14 that are equal in length and width or approximately equal in length and width. Approximately in this context means within 1 centimeter of being equal in length or width.

FIG. 4 shows the finished folded product 16 packaged in its final form. Preferred embodiments and the inventor's anticipated best mode of this method include a folded product 16 that has a fastener 21 at either end attaching the sections to each other and an optional card 22 that is included with the completely folded structure 16. The wrapper 18 itself has a hanging hole 19 punched into it, ideally at a point that extends away from the folded product 16. If there is a card enclosed with the completely folded structure, then there will be a hanging hole 19 punched into that structure as well.

This configuration allows a single release liner, featuring a plurality of strips of adhesive material to be divided into separate release liners each featuring less than all of the strips of adhesive material attached to same. While the inventor anticipates that it will be more commercially practical for the perforations to separate each of the strips of adhesive material, a skilled artisan can appreciate that more than one strip of adhesive material can be attached to a single section of the base layer. This configuration allows the user to easily store the correct amount of packing material needed to seal a paper-based container without storing an entire roll of tape. In addition, it allows the user to place the strips of tape anywhere on the container that they desire. The design also helps the device lay flat which is more aesthetically pleasing as the sections of the folded "booklet" can be stapled or glued together. When the user opens the device, they have access to a booklet of tape strips and release liners. A hole punched in the top of the device allows the device to be folded and then hung from a hook, such as a in a point-of-sale display.

Reference throughout the specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout the specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

It is understood that the above described embodiments are only illustrative of the application of the principles of the present invention. The present invention may be embodied in other specific forms without departing from its spirit or essential characteristics. The described embodiment, including the best mode, is to be considered in all respects only as illustrative and not restrictive. The scope of the invention is, therefore, indicated by the appended claims, if any, in conjunction with the foregoing description.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention.

I claim:

1. A method of storing and transporting strips of adhesive material comprising:
   providing a release liner;
   dividing the release liner into a plurality of sections by cutting perforations into the release liner;
   folding the release liner along the perforations to stack the sections one on top of the other to form a folded product;
   attaching at least one strip of adhesive material to at least one of the sections of the release liner such that an entirety of the at least one adhesive strip is attached to the release liner; and
   packaging the folded product in a wrapper that has a hanging hole punched therein.

2. The method of claim 1 further comprising a plurality of strips of adhesive material wherein each section of the release liner has a single strip of adhesive material attached thereto.

3. The method of storing and transporting strips of adhesive material of claim 2 wherein the perforations separate the release liner into vertically oriented sections that are equal in width and height.

4. The method of storing and transporting strips of adhesive material of claim 2 wherein the perforations separate the release liner into vertically oriented sections having different heights and/or widths.

5. The method of storing and transporting strips of adhesive material of claim 2 wherein the strips of adhesive are all the same length.

6. The method of storing and transporting strips of adhesive material of claim 2 wherein the strips of adhesive are not all the same length.

7. The method of storing and transporting strips of adhesive material of claim 2 further comprising at least two strips of adhesive material being attached to at least one of the sections of the release liner.

8. The method of storing and transporting strips of adhesive material of claim 2 further comprising packaging a card with the folded release liner that has a hole in it.

9. The method of storing and transporting strips of adhesive material of claim 1 further comprising packaging the folded product in a flow wrapper that is closed by heat sealing.

10. The method of storing and transporting strips of adhesive material of claim 1 further comprising punching a hole in the release liner after the sections of release liner are folded.

11. A method of storing and transporting strips of adhesive material comprising:
    cutting perforations into a release liner thereby separating the release liner into sections;
    attaching a strip of adhesive material to each section such that the entire length of the strip of adhesive material is attached to a single section of the release liner;
    folding the sections of the release liner forming a folded product that is the approximate size and width of a single section of the release liner;
    using a fastener to secure each section of the release liner in the folded product to each other; and
    packaging the folded product in a wrapper.

12. The method of storing and transporting strips of adhesive material of claim 11 further comprising attaching two strips of adhesive material of different lengths to a single section of the release liner.

13. The method of storing and transporting strips of adhesive material of claim 11 wherein the perforations separate the release liner into vertically oriented sections that are equal in width and height.

* * * * *